US012709088B2

(12) United States Patent
Kuwabara

(10) Patent No.: US 12,709,088 B2
(45) Date of Patent: Aug. 18, 2026

(54) FILM, LAMINATED FILM, AND PACKAGING BAG

(71) Applicant: Fujimori Kogyo Co., Ltd., Tokyo (JP)

(72) Inventor: Hiroshi Kuwabara, Tokyo (JP)

(73) Assignee: ZACROS Corporation, Tokyo (JP)

( * ) Notice: Subject to any disclaimer, the term of this patent is extended or adjusted under 35 U.S.C. 154(b) by 305 days.

(21) Appl. No.: 18/275,955

(22) PCT Filed: Jan. 19, 2022

(86) PCT No.: PCT/JP2022/001716

§ 371 (c)(1),
(2) Date: Aug. 4, 2023

(87) PCT Pub. No.: WO2022/172702

PCT Pub. Date: Aug. 18, 2022

(65) Prior Publication Data

US 2024/0116280 A1 Apr. 11, 2024

(30) Foreign Application Priority Data

Feb. 9, 2021 (JP) ................................ 2021-018687

(51) Int. Cl.
*B32B 27/08* (2006.01)
*B29C 48/00* (2019.01)
(Continued)

(52) U.S. Cl.
CPC ............ *B32B 27/08* (2013.01); *B29C 48/022* (2019.02); *B29C 48/08* (2019.02); *B29C 48/21* (2019.02);
(Continued)

(58) Field of Classification Search
None
See application file for complete search history.

(56) References Cited

U.S. PATENT DOCUMENTS

2016/0229157 A1 8/2016 Clare
2020/0324513 A1 10/2020 Tian et al.
2021/0023828 A1 1/2021 Yamada et al.

FOREIGN PATENT DOCUMENTS

EP 197054 B1 7/1992
JP 2002522273 A 7/2002
(Continued)

OTHER PUBLICATIONS

European Search Report for Application No. 22752534.2 dated Nov. 27, 2024.

(Continued)

*Primary Examiner* — Jennifer A Boyd
(74) *Attorney, Agent, or Firm* — Harris Beach Murtha Cullina PLLC

(57) ABSTRACT

This film includes a first resin layer formed of a high-density polyethylene (HDPE) and a second resin layer formed of a medium-density polyethylene (MDPE) made to be adjacent to each other by co-extrusion, in which the first resin layer and the second resin layer are stretched in the same direction. In addition, the film may include a first surface layer formed of a high-density polyethylene (HDPE), an intermediate layer formed of a medium-density polyethylene (MDPE), and a second surface layer formed of a medium-density polyethylene (MDPE) made to be adjacent to each other in this order by co-extrusion, and the first surface layer, the intermediate layer and the second surface layer are stretched in the same direction.

9 Claims, 2 Drawing Sheets

(51) Int. Cl.

| | |
|---|---|
| ***B29C 48/08*** | (2019.01) |
| ***B29C 48/21*** | (2019.01) |
| ***B29K 23/00*** | (2006.01) |
| ***B29L 9/00*** | (2006.01) |
| ***B29L 22/00*** | (2006.01) |
| ***B32B 7/035*** | (2019.01) |
| ***B32B 27/32*** | (2006.01) |

(52) U.S. Cl.

CPC .............. *B32B 7/035* (2019.01); *B32B 27/32* (2013.01); *B29K 2023/0641* (2013.01); *B29K 2023/065* (2013.01); *B29L 2009/00* (2013.01); *B29L 2022/00* (2013.01); *B32B 2250/02* (2013.01); *B32B 2307/516* (2013.01); *B32B 2439/06* (2013.01); *B32B 2553/00* (2013.01)

(56) References Cited

FOREIGN PATENT DOCUMENTS

| | | | | |
|---|---|---|---|---|
| JP | 2006007630 A | 1/2006 | | |
| JP | 2019166810 A | 10/2019 | | |
| JP | 2019171860 A | 10/2019 | | |
| JP | 2019189333 A | 10/2019 | | |
| WO | 0009324 A1 | 2/2000 | | |
| WO | WO-2019132954 A1 * | 7/2019 | ............. | B32B 27/16 |

OTHER PUBLICATIONS

International Search Report for Application No. PCT/JP2022/001716 dated Mar. 8, 2022.

* cited by examiner

FILM, LAMINATED FILM, AND PACKAGING BAG

FIELD OF THE INVENTION

The present invention relates to a film, a laminated film, and a packaging bag.

BACKGROUND OF THE INVENTION

As conventional packaging bags, self-standable standing pouches in which a bottom film folded in half is disposed between a pair of trunk films are in use. Japanese Unexamined Patent Application, First Publication No. 2006-7630 describes the use of a laminate film in which a sealant is used as the innermost layer and a stretched film is used as a base material.

SUMMARY OF THE INVENTION

Technical Problem

In laminated films that are used for conventional packaging bags, a thermal adhesive resin (sealant) layer of polyethylene (PE) or the like is laminated on an inner surface, and a base material of polyethylene terephthalate (PET) or the like, which is more heat-resistant than the sealant, is laminated on an outer surface. At the time of thermal adhesion of a laminated film, the inner surface of the laminated film is bonded by melting the sealant. However, packaging bags containing different kinds of resins have a problem in that recycling for plastic container packaging is difficult.

In recent years, mono-material container packaging for which a single resin is used has been advocated to facilitate recycling. However, when packaging bags are formed of a film for which a single resin is used, there is a problem in that a laminated film is likely to tear when a packaging bag filled with contents has dropped.

The present invention has been made in consideration of the above-described circumstances, and an objective of the present invention is to provide a film, a laminated film, and a packaging bag that are capable of suppressing tearing when a packaging bag filled with contents has dropped.

Solution to Problem

In order to solve the above-described problem, a film of an aspect of the present invention is a film including a first resin layer formed of a high-density polyethylene (HDPE) and a second resin layer formed of a medium-density polyethylene (MDPE) made to be adjacent to each other by co-extrusion, in which the first resin layer and the second resin layer are stretched in the same direction.

In addition, a film of another aspect of the present invention is a film including a first surface layer formed of a high-density polyethylene (HDPE), an intermediate layer formed of a medium-density polyethylene (MDPE), and a second surface layer formed of a medium-density polyethylene (MDPE) made to be adjacent to each other in this order by co-extrusion, in which the first surface layer, the intermediate layer and the second surface layer are stretched in the same direction.

The intermediate layer may contain an additive other than resins.

A stretch ratio in the same direction may be twice to 10 times.

In addition, a laminated film of the present invention includes the film as a base material and a sealant layer formed of a polyethylene-based resin laminated on the base material.

A layer formed of the high-density polyethylene (HDPE) may be disposed on a side of the base material opposite to the sealant layer.

In addition, in a packaging bag of the present invention, at least one member is formed of the laminated film.

Advantageous Effects of Invention

According to the present invention, since a stretched film in which a high-density polyethylene (HDPE) and a medium-density polyethylene (MDPE) are laminated together by co-extrusion is used as a base material, it is possible to suppress tearing when a packaging bag filled with contents has dropped.

DETAILED DESCRIPTION OF THE INVENTION

Figure 1:
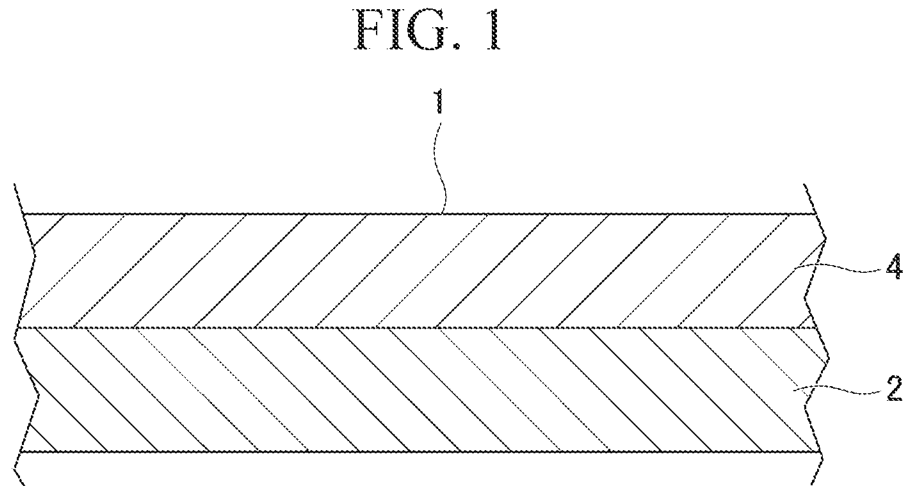
FIG. 1 is an enlarged cross-sectional view showing an embodiment of a film of the present invention.

Hereinafter, the present invention will be described based on preferable embodiments. As shown in FIG. 1, a film 1 of the present embodiment is a film 1 including a first resin layer 2 formed of a high-density polyethylene (HDPE) and a second resin layer 4 formed of a medium-density polyethylene (MDPE) made to be adjacent to each other by co-extrusion, in which the first resin layer and the second resin layer are stretched in the same direction.

Figure 2:
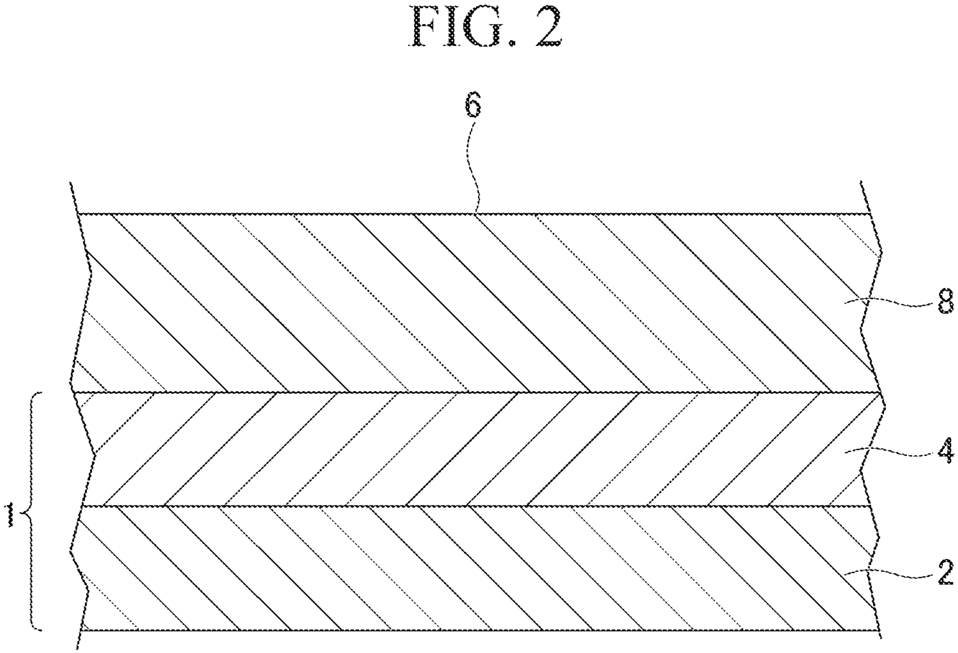
FIG. 2 is an enlarged cross-sectional view showing an embodiment of a laminated film of the present invention.

A laminated film 6 of an embodiment is formed of a polyethylene-based resin layer mainly containing a polyethylene-based resin like an example shown in FIG. 2. Therefore, it is possible to realize mono-material container packaging using the laminated film 6 of the embodiment. As the polyethylene-based resin layer, specifically, aside from the first resin layer 2 and the second resin layer 4, a sealant layer 8 to be described below and the like are exemplary examples, but the polyethylene-based resin layer is not limited thereto.

The polyethylene-based resin may be a homopolymer of ethylene or may be a copolymer mainly containing ethylene. As a monomer other than ethylene (comonomer), one or more of α-olefins such as 1-butene, 1-hexene and 1-octene, cyclic olefins such as norbomene, and vinyl-based monomers such as vinyl acetate, vinyl chloride and acrylic acid are exemplary examples. In a case where the polyethylene-based resin is a copolymer of monomers having an ester group such as vinyl acetate, the copolymer may turn into a copolymer containing vinyl alcohol due to the saponification of some of the ester groups.

The proportion of ethylene in the configuration monomers of the polyethylene-based resin is preferably 50 weight % or more and may be, for example, 80 to 100 weight %. Ethylene or the copolymer may be a compound derived from a fossil resource such as petroleum or may be a compound derived from biomass such as plants. A resin that is contained in the polyethylene-based resin layer may be only the polyethylene-based resin. The polyethylene-based resin layer may contain an additive other than resins. The additive is not particularly limited, and, for example, an antioxidant, a lubricant, an anti-blocking agent, a flame retardant, an ultraviolet absorber, a filler, a light stabilizer, an antistatic agent, a colorant, a crosslinking agent and the like are exemplary examples. The additive may be a component compatible with resins or a component incompatible with resins.

Polyethylene-based resins may be classified based on density according to practice commonly used by persons skilled in the art, and, for example, polyethylene-based resins having a density of 910 kg/m$^3$ or more and less than 930 kg/m$^3$ may be classified as type 1 (low density), polyethylene-based resins having a density of 930 kg/m$^3$ or more and less than 942 kg/m$^3$ may be classified as type 2 (medium density), and polyethylene-based resins having a density of 942 kg/m$^3$ or more may be classified as type 3 (high density) as in conventional JIS K 6748. In addition, according to JIS K 6922-1 revised on 2018, polyethylene-based resins having a density of 911 kg/m$^3$ or less may be classified as ultralow-density class, polyethylene-based resins having a density of 925 kg/m$^3$ or less, which is a higher density than the previous density, may be classified as low-density class, polyethylene-based resins having a density of 940 kg/m$^3$ or less, which is a higher density than the previous density, may be classified as medium-density class, and polyethylene-based resins having a higher density than the previous density may be classified as high-density class. Linear low-density polyethylene (LLDPE) may be classified as the same as low-density polyethylene (LDPE).

According to the film 1 of the embodiment, since the first resin layer 2 (HDPE layer) and the second resin layer 4 (MDPE layer) made to be adjacent to each other by co-extrusion are made to be adjacent to each other by co-extrusion and stretched in the same direction, it is possible to suppress tearing caused by the dropping or the like of packaging bags filled with contents. Since the HDPE layer and the MDPE layer are integrated by co-extrusion, there is no case where an adhesive layer or the like is present between the layers, and a structure in which different resin layers are directly adjacent to each other is obtained. Compared with the HDPE layer, the MDPE layer is soft and does not tear easily. In addition, since the difference in physical properties between the HDPE layer and the MDPE layer is small, adhesion between the layers is excellent.

The stretching direction of the film 1 obtained by co-extrusion is not particularly limited and may be a machine direction (MD) or a transverse direction (TD). The layers may be biaxially stretched in the MD direction and the TD direction. The stretch ratio is preferably twice to 10 times. Since the HDPE layer and the MDPE layer are stretched after being laminated by co-extrusion, the stretching directions and stretch ratios of the HDPE layer and the MDPE layer become the same as each other. In the case of biaxial stretching, the stretch ratios in the individual stretching directions may be the same as each other or the stretch ratio in the MD direction and the stretch ratio in the TD direction may be different from each other. The stretching direction in uniaxial stretching and biaxial stretching may be an oblique direction intersecting with the MD direction and the TD direction.

The film 1 of the embodiment may be a resin film made of only the HDPE layer and the MDPE layer. As will be described below, a layer such as the sealant layer 8 may be laminated. In the thickness direction of the film 1, the HDPE layer is disposed on one side, and the MDPE layer is disposed on the other side, thereby forming a structure in which the heat resistance is higher on the HDPE layer side and cohesive failure is less likely to occur on the MDPE layer side.

The film 1 may have one HDPE layer and one MDPE layer. The film 1 may have two or more HDPE layers or two or more MDPE layers. For example, in a case where two or more MDPE layers are provided, a first surface layer formed of HDPE, an intermediate layer formed of MDPE and a second surface layer formed of MDPE may be made to be adjacent to each other in this order by co-extrusion, and the layers may be stretched in the same direction.

The HDPE layer may contain HDPE in a proportion of 50 weight % or more, furthermore, 80 to 100 weight %. In a case where two or more HDPE layers are provided, the individual HDPE layers may contain the same resin component or may contain different resin components. The two or more HDPE layers may be different in the presence or absence, component or proportion of the additive. The two or more HDPE layers may contain the same additive or may contain different additives.

The MDPE layer may contain MDPE in a proportion of 50 weight % or more, furthermore, 80 to 100 weight %. In a case where two or more MDPE layers are provided, the individual MDPE layers may contain the same resin component or may contain different resin components. The two or more MDPE layers may be different in the presence or absence, component or proportion of the additive. The two or more MDPE layers may contain the same additive or may contain different additives.

The thickness of the film 1 in which the HDPE layer and the MDPE layer are combined together is not particularly limited and is, for example, approximately 10 to 50 μm. The thickness of the HDPE layer is not particularly limited and is, for example, approximately 5 to 25 μm. The thickness of the MDPE layer is not particularly limited and is, for example, approximately 5 to 45 μm. In order to improve the effect of suppressing the tearing of the film 1, the MDPE layer is preferably thicker than the HDPE layer.

In a case where the film 1 has the first surface layer (HDPE layer), the intermediate layer (MDPE layer) and the second surface layer (MDPE layer), between the MDPE layers, the intermediate layer may contain the additive other than resins with no additives in the second surface layer. In such a case, when the second surface layer side is used for sealing, the sealing property becomes favorable.

The film 1 of the embodiment can be used as a base material of the laminated film 6. In the laminated film 6, the sealant layer 8 formed of a polyethylene-based resin may be laminated. The base material and the sealant layer 8 may be bonded to each other through an adhesive layer. The base material may be bonded to the sealant layer 8 on the HDPE layer side. The base material may be bonded to the sealant layer 8 on the MDPE layer side. In a case where the sealant layer 8 is bonded to the MDPE layer, since the HDPE layer becomes an outer surface opposite to the sealant layer 8, higher heat resistance can be obtained compared with a case where the MDPE layer becomes the outer surface.

The sealant layer 8 can be used for the bonding of the laminated film 6. The sealant layer 8 is preferably formed of a non-stretched polyethylene-based resin. As specific examples of a material that forms the sealant layer 8, for example, polyethylene-based resins having a relatively low density such as linear low-density polyethylene (LLDPE) and low-density polyethylene (LDPE) are exemplary examples. The material that forms the sealant layer 8 may be one kind of a polyethylene-based resin or may be a blend of two or more kinds of polyethylene-based resins. The thickness of the sealant layer 8 is not particularly limited and is, for example, approximately 60 to 180 μm.

The base material is laminated outside the sealant layer 8 in the thickness direction of the laminated film 6. When the laminated film 6 is transported in the length direction and used, the base material is preferably capable of reinforcing the mechanical strength of the laminated film 6. In conventional laminated films, a PET film or the like was used as the base material; however, in the laminated film 6 of the embodiment, a polyethylene-based resin is used as the base material, and thus the recycling efficiency improves. In addition, as the base material, the resin layer having a relatively high density, such as MDPE or HDPE, is provided, and thus the barrier property improves.

The proportion of the sealant layer 8 in the thickness of the laminated film 6 is preferably 50% or more and may be approximately 60%, 70%, 80%, 90%, 95% or an intermediate value thereof. The proportion of the total thickness of the sealant layer 8 and the base material in the thickness of the laminated film 6 is preferably 50% or more and may be approximately 60%, 70%, 80%, 90%, 95%, 99% or an intermediate value thereof.

The adhesive layer may be formed of an adhesive or may be formed of an anchor coating agent. A material that forms the adhesive layer is not particularly limited, and an urethane-based compound, an epoxy-based compound, an isocyanate-based compound, polyethyleneimine and an organic titanium compound such as titanium alkoxide are exemplary examples. The thickness of the adhesive layer is, for example, approximately 0.1 to 10 μm, approximately 1 to 6 μm or approximately 3 to 4 μm. The adhesive layer may contain a resin or may be an adhesive layer containing no resins.

A print layer may be laminated between the sealant layer 8 and the base material. In a case where the laminated film 6 has a different resin layer on the outside of the base material, a print layer may be laminated between the base material and the different resin layer. The position of the print layer is not particularly limited, and, for example, the outer surface of the sealant layer 8, the inner surface or outer surface of the base material, the inner surface or outer surface of the different resin layer and the like are exemplary examples.

The print layer can be formed by printing ink in a solid shape or a pattern shape by a printing method such as gravure printing, letterpress printing, offset printing, screen printing or inkjet. The thickness of the print layer is not particularly limited and is, for example, approximately 0.5 to 10 μm.

The print layer may be formed on the entire surface of the laminate or may be formed on a part of the surface of the laminate. Two or more print layers may be overlaid.

The ink for forming the print layer may contain a coloring material such as a pigment or a dye and a binder. The binder is not particularly limited, and polyamide, polyurethane, polyester, polyvinyl chloride, polyvinyl acetate, a vinyl chloride-vinyl acetate copolymer, an acrylic polymer, polybutadiene, cyclized rubber and the like are exemplary examples. The ink may contain a solvent such as water, an organic solvent or a vegetable oil. After printing, the ink can be dried by the volatilization of the solvent, the curing of the ink or the like. In order to promote the drying of the ink, heating, ultraviolet irradiation or the like may be performed. The print layer may contain a resin or may be a print layer containing no resins.

In the laminated film 6, as a dissimilar material layer other than the resin layers, aside from the adhesive layer and the print layer, a heat-resistant varnish layer, a deposition layer, a coating layer or the like may be laminated. As a dissimilar material, metals such as aluminum, inorganic compounds such as silica and alumina and the like are exemplary examples. The print layer, the coating layer, the adhesive layer and the like may contain a resin other than polyethylene as a material of the ink, a paint, the adhesive or the like. A method for forming the laminated film 6 is not particularly limited, and dry lamination, extrusion lamination, heat lamination, co-extrusion, coating and the like are exemplary examples. Different methods may be used to laminate the individual layers.

In the laminated film 6 of the embodiment, layers having a thin thickness such as the adhesive layer, the print layer and the heat-resistant varnish layer may be layers containing a resin. Layers having a relatively thin thickness other than the above-described layers are preferably only the polyethylene-based resin layers. Regarding the thicknesses of the layers having a thin thickness, the thickness of each of the individual layers or the total thickness of the individual layers is, for example, 10 μm or less or 5 μm or less.

Figure 3:
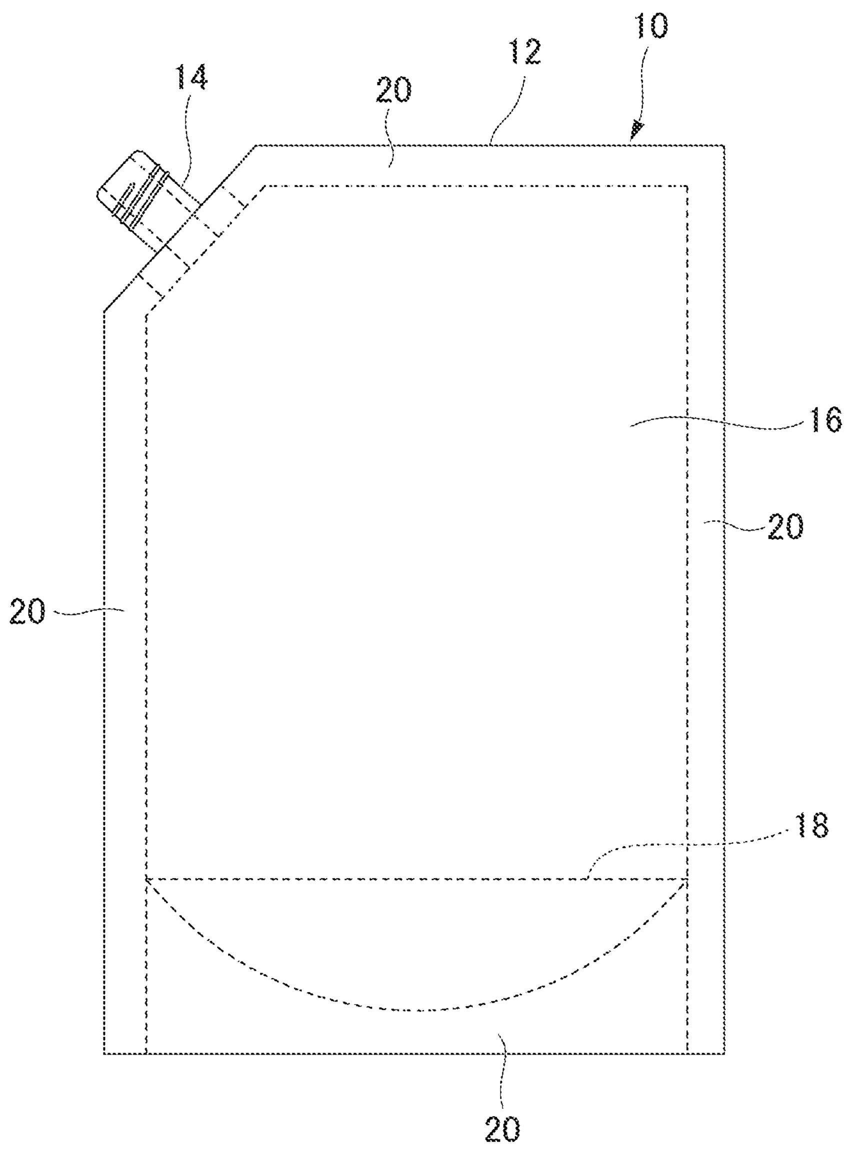
FIG. 3 is a front view showing an embodiment of a packaging bag of the present invention.

The laminated film 6 can be used to produce a packaging bag. FIG. 3 is a front view showing a standing pouch 10 as an example of the packaging bag for which the laminated film 6 is used, and this standing pouch 10 includes a hollow container main body 12 and a spout member 14 provided at one end of the container main body 12. The container main body 12 is formed of, for example, two trunk films 16 forming rectangular shapes having the same planer shape as each other and a bottom film 18. The trunk films 16 and the bottom film 18 are all formed of the laminated films 6, and the outer edge portions of the individual sealant layers 8 are thermally fused together to form a heat seal portion 20. Therefore, the container main body 12 forms a bag shape as a whole, contents can be put into and taken out of the container main body 12 through the spout member 14, and, in a state where there are no contents inside, the standing pouch collapses and forms a planar shape. The present invention is not limited to standing pouches and can be applied to a variety of packaging bags.

In the packaging bag, at least one member needs to be formed of the laminated film. In a case where the packaging bag has trunk members and a bottom member, the laminated film is preferably used for the trunk member having an opening part. In the lower portion of the packaging bag, a bottom part material folded into half along a folding line may be bonded between the pair of trunk members. A flat bag may be produced by making laminated films having no folding line face each other and sealing the circumferential edge portions of the individual laminated films. A cut such as a notch may be formed in the circumferential edge of the opening part to facilitate the opening of the packaging bag. When a cut is formed in the seal portion where the inner surfaces of the laminated films 6 are bonded to each other, it is possible to ensure the sealability of the packaging bag.

The dimensions of the packaging bag are not particularly limited, and, for example, in the use of refillable containers, the height in the vertical direction is approximately 100 to 500 mm, the width in the lateral direction is approximately 70 to 300 mm, and the fillable amount is approximately 100 $cm^3$ to 5000 $cm^3$. As the state of the contents, fluids such as liquid, powder and grain are exemplary examples. The kind of the contents is not particularly limited, and detergents, drugs, cosmetics, pharmaceuticals, beverages, seasonings, inks, paints, fuels and the like are exemplary examples.

The packaging bag may have a filling port, a spout or the like. For example, the filling port, the spout or the like forms an opening between the front and rear trunk members in the upper portion of the packaging bag, and the opening can be used for the filling or pouring of the contents. The packaging bag may be sealed by bonding the trunk members together after the filling of the contents. At the time of opening the packaging bag, a place where the trunk members are bonded together may be removed by cutting, tearing or the like. The spout that is formed from the trunk members may be formed in a shape that thinly protrudes from the upper portion or corner portion of the packaging bag.

Hitherto, the present invention has been described based on the preferable embodiments, but the present invention is not limited to the above-described embodiments and can be modified in a variety of manners within the scope of the gist of the present invention. As the modification, the addition, substitution, omission and other changes of configuration elements are exemplary examples.

The laminated film of the embodiment mainly contains the polyethylene-based resin and thus can be used in a variety of uses without being limited to packaging bags such as pouches, bags and containers, packaging films and the like. Particularly, the laminated film is soft and thus capable of forming packaging bags for soft packaging. The packaging bag may be formed of only the above-described laminated film or may be combined with an accessory such as a label, a tag, a straw or an outer case. From the viewpoint of recycling, it is preferable that the accessory be separable from the packaging bag.

EXAMPLES

Hereinafter, the present invention will be described more specifically as examples, but is not limited to these examples.

A film of Example 1 can be formed by producing a co-extruded film having three layers of HDPE/MDPE/MDPE using a three-layer co-extrusion device and uniaxially stretching these three layers in the same direction. In addition, a laminated film of Example 1 can be formed by laminating a sealant layer on an MDPE layer side of the film of Example 1 as a base material through an adhesive layer by a dry lamination method. The laminated film of Example 1 is heat-resistant upon heat sealing. In addition, when a packaging bag is produced from the laminated film of Example 1, filled with contents and dropped, it is possible to improve the resistance of the packaging bag.

Comparative Example 1

A laminated film of Comparative Example 1 is formed by laminating a sealant layer on a uniaxially-stretched film of HDPE as a base material through an adhesive layer by a dry lamination method. The laminated film of Comparative Example 1 is heat-resistant upon heat sealing; however, when a packaging bag is filled with contents and dropped, the packaging bag is likely to tear.

Comparative Example 2

A film of Comparative Example 2 is formed by producing a co-extruded film having three layers of HDPE/LLDPE/LLDPE using a three-layer co-extrusion device and uniaxially stretching these three layers in the same direction. The film of Comparative Example 2 significantly curls and is difficult to process at the time of laminating a sealant layer by a dry lamination method.

INDUSTRIAL APPLICABILITY

According to the present invention, a stretched film in which a high-density polyethylene (HDPE) and a medium-density polyethylene (MDPE) are laminated together by co-extrusion is used as a base material, whereby it is possible to suppress tearing when a packaging bag filled with contents has dropped, and thus the present invention is industrially applicable.

REFERENCE SIGNS LIST

1 Film
2 First resin layer
4 Second resin layer
6 Laminated film
8 Sealant layer
10 Standing pouch (packaging bag)
12 Container main body
14 Spout member
16 Trunk film
18 Bottom film
20 Heat seal portion

The invention claimed is:

1. A laminated film comprising a resin film and a sealant layer laminated on the resin film:

wherein the resin film comprises a first resin layer formed of a high-density polyethylene (HDPE) and a second resin layer formed of a medium-density polyethylene (MDPE), the first resin layer and the second resin layer being made to be adjacent to each other by coextrusion, and the first resin layer and the second resin layer are stretched in the same direction, the high-density polyethylene (HDPE) has a density higher than 940 kg/m$^3$, the medium-density polyethylene (MDPE) has a density of higher than 925 kg/m$^3$ and 940 kg/m$^3$ or less, the thickness of the first resin layer is 5 to 25 μm, the thickness of the second resin layer is 5 to 45 μm, the second resin layer is thicker than the first resin layer, the sealant layer is formed of a polyethylene-based resin selected from a linear low density polyethylene (LLDPE) and a low-density polyethylene (LDPE), the first resin layer is disposed opposite to the sealant layer, the sealant layer is bonded to the second resin layer, the thickness of the sealant layer is 60 to 180 μm, and a proportion of the sealant layer to the thickness of the laminated film is 50% or more.

2. The laminated film according to claim 1, wherein the resin film comprises an intermediate layer formed of a medium-density polyethylene (MDPE) between a first surface layer being the first resin layer and a second surface layer being the second resin layer; and the first surface layer, the intermediate layer and the second surface layer are made to be adjacent to each other in this order by co-extrusion, and the first surface layer, the intermediate layer and the second surface layer are stretched in the same direction.

3. The laminated film according to claim 2, wherein the intermediate layer contains an additive other than resins.

4. The laminated film according to claim 1, wherein a stretch ratio in the same direction is twice to 10 times.

5. The laminated film according to claim 1, wherein the sealant layer is formed of a non-stretched polyethylene-based resin.

6. The laminated film according to claim 2, wherein a stretch ratio in the same direction is twice to 10 times.

7. The laminated film according to claim 2, wherein the sealant layer is formed of a non-stretched polyethylene-based resin.

8. A packaging bag, wherein at least one member is formed of the laminated film according to claim 1.

9. A packaging bag, wherein at least one member is formed of the laminated film according to claim 2.

* * * * *